UNITED STATES PATENT OFFICE.

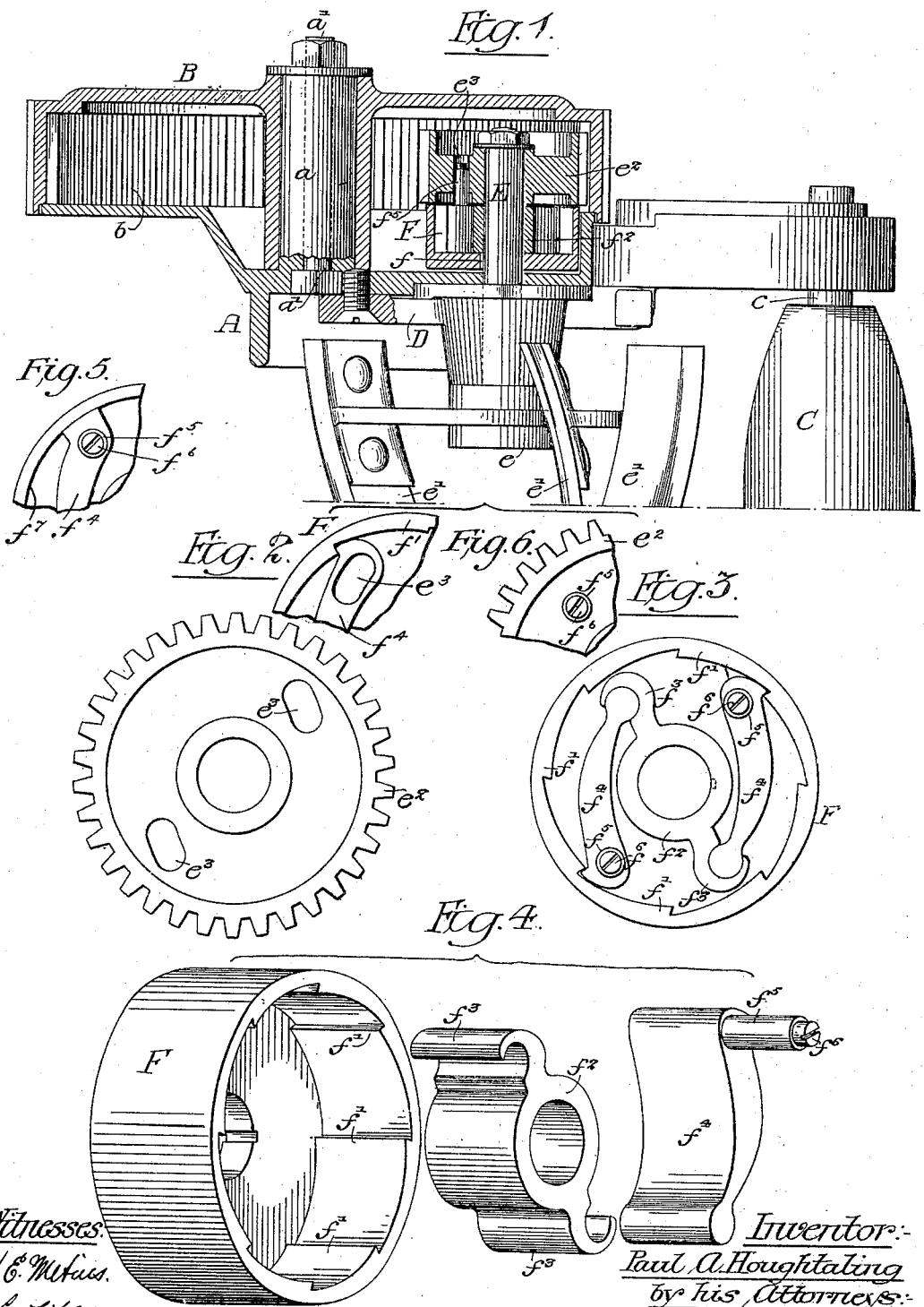

PAUL A. HOUGHTALING, OF RIVERTON, NEW JERSEY.

CLUTCH.

SPECIFICATION forming part of Letters Patent No. 688,644, dated December 10, 1901.

Application filed July 27, 1901. Serial No. 69,924. (No model.)

*To all whom it may concern:*

Be it known that I, PAUL A. HOUGHTALING, a citizen of the United States, and a resident of Riverton, New Jersey, have invented certain Improvements in Clutches, of which the following is a specification.

My invention relates to certain improvements in clutches, and more particularly to an improved form of clutch for use in connection with lawn-mowers and similar mechanism in which a driving member is detachably coupled to a driven member, so as to allow of independent motion of the latter under certain conditions of speed variations.

The object of my invention is to provide a simple and at the same time a substantial device by which the knife-driving mechanism of a lawn-mower is thrown into and out of operative engagement with the traction-wheel thereof by certain variations of the speed of said wheel. This object I attain as hereinafter set forth, reference being had to the accompanying drawings, in which—

Figure 1 is a sectional view of sufficient of a lawn-mower to show the application of my improved clutch. Fig. 2 is an enlarged view of the pinion used in connection with my device. Fig. 3 is a view showing the detail construction of the clutch with the pinion removed. Fig. 4 is a perspective view of the details of the clutch mechanism, and Figs. 5 and 6 are views of modified forms of my device.

Referring to the drawings, A is a part of the frame of a lawn-mower shown partly in section in Fig. 1. On the frame is a stud $a$, on which is a traction-wheel B. A bolt $a'$ passes through this stud and is provided with a nut and washer for retaining the said wheel in position. There is a rear projection to this frame A, in which is a bearing for the shaft $c$ of the ordinary roller C.

D is a bearing preferably held to the frame by screws. Carried by the bearing is a knife-shaft E, having at one end a hub $e$, provided with arms which carry the knives $e'$ $e'$, and on the other end of the shaft E is the clutch mechanism for connecting and releasing said shaft from operative engagement with the traction-wheel B.

The frame A of the machine is extended, so as to form with the wheel B a casing. The wheel has internal teeth $b$, which mesh with the teeth on one of the clutch members— namely, a pinion $e^2$, which is loosely mounted on the knife-shaft E, there being slots $e^3$ $e^3$ (two in the present instance) in the web of said pinion. These slots are of the form shown in Fig. 2, being made eccentric to the knife-shaft E.

Fixed to the knife-shaft by a key $f$ is a ratchet-wheel F, having internal teeth $f'$ $f'$, there being within this wheel a carrier $f^2$, loosely mounted on the knife-shaft and having arms $f^3$ $f^3$ of the shape shown. The ends of these arms are recessed to form sockets, in which fit the correspondingly-shaped ends of pawls $f^4$ $f^4$ of the shape shown in perspective in Fig. 4. These pawls $f^4$ are curved in the present instance and are hooked at the ends, the said hooked part being formed to engage the teeth $f'$ of the wheel F. Projecting from the side of each pawl near the hooked end is a screw-stud $f^6$, carrying in the present instance rollers $f^5$. These rollers project considerably beyond the wheel F and enter the slots $e^3$ $e^3$ in the pinion $e^2$.

In operation when the mower is moved forward the traction-wheel B by its revolution causes the pinion $e^2$ to turn on the shaft E. This action of the said pinion, however, causes pressure to be exerted against the rollers $f^5$, and owing to the fact that they are in slots eccentric to the center of the shaft E they at once move in said slots farther away from the shaft, the ends fitting the sockets acting as pivotal points. By this means the pawls $f^4$ are swung outwardly and their hooked ends almost immediately come in contact with one pair of the ratchet-teeth $f'$ of the wheel F, thus clutching the pinion $e^2$ to said wheel, as well as its attached knife-shaft. The revolution of the knife-shaft with its knives is continued through the above mechanism until the rate of turning of the traction-wheel is decreased. If the knife-blades are doing no work, they will then tend to continue in motion on account of their momentum, and will consequently tend to revolve the wheel F at a higher speed than that of the pinion $e^2$. The teeth $f'$ on the said wheel at once move the hooked ends of the pawls $f^4$ $f^4$ inwardly, throwing the hooks out of engagement with the teeth $f'$ and allowing the knives to continue their revolution until stopped by friction. On the traction-wheel again being moved at a speed sufficient to cause the pinion $e^2$ to turn as rapidly as the shaft E and the wheel F the hooked ends of the pawls $f^4$ $f^4$ are again thrown out into engagement with the teeth of the said wheel.

While I have described my invention as applied to a lawn-mower, it is to be noted that I do not confine myself to this single application, as it will be understood by those skilled in the art that my device may with advantage be used in connection with clutches for the transmission of power, as a noiseless attachment for the winding-stem of a watch, as a ratchet for a brace, or on the spring-roller of a window-curtain, as well as in many similar mechanisms.

It will be understood that I do not confine myself to the use of but two pawls in a clutch, as I may, if desired, employ more than this number, depending upon the amount of power transmitted and upon the dimensions of the parts. On the other hand, it may be used as a friction-clutch pure and simple by removing the teeth altogether, as in Fig. 5, leaving a surface $f^7$, which the pawls grip when operated, as above set forth.

In some cases, without departing from the novel features of my invention, I may place the rollers $f^5$ upon the pinions $e^2$, as illustrated in Fig. 6, and form the eccentric slots in the pawls.

I claim as my invention—

1. In a clutch the combination of a driving member, a driven shaft having a wheel fixed thereto, slots in the driving member eccentric to the axis of revolution thereof and arms having projections entering said slots and constituted to engage said wheel when the said projections are in the part of the slots farthest away from the axis of revolution of the driving-wheel, the projections serving to transmit power from the driving member to the wheel on the driven shaft, substantially as described.

2. In a clutch, the combination of a driving-wheel, a driven shaft having a ratchet-wheel fixed thereto, slots in the driving-wheel eccentric to the axis of revolution thereof and pawls having projections entering said slots and constructed to engage the teeth on said ratchet-wheel when the said projections are in the part of the slots farthest away from the axis of revolution of the driving-wheel, said projections performing the double function of operating the pawls and transmitting power from the driving-wheel to the ratchet-wheel through said pawls, substantially as described.

3. In a clutch, the combination of a driving-wheel, a driven shaft carrying a ratchet-wheel keyed to it, a carrier loosely mounted on the said shaft, pawls pivoted thereto with mechanism operated by the driving-wheel for throwing the pawls into engagement with the teeth of the ratchet-wheel when said driving-wheel turns at a higher rate of speed than the shaft, said mechanism performing the double function of operating the pawls and transmitting power from the driving-wheel to the ratchet-wheel through said pawls, substantially as described.

4. The combination of a driving-wheel, a driven shaft, an internally-toothed ratchet-wheel keyed thereto, a carrier loosely mounted on the shaft within the said ratchet-wheel, pawls pivoted thereto and constructed to be thrown into engagement with the teeth of said ratchet-wheel when they are turned on their pivots, with mechanism operated by the said driving-wheel serving the double purpose of throwing the said pawls into and out of engagement with the ratchet-wheel when the relative speed of the two wheels is varied, and transmitting power from the driving-wheel to the pawls and to the ratchet-wheel, substantially as described.

5. The combination in a clutch, of a driving-wheel having in its web slots eccentric to its axis of revolution, a driven shaft having a ratchet-wheel keyed thereto, a carrier on said shaft independent of the driving-wheel, pawls pivoted thereto, said pawls having projections entering the slots of the driving-wheel, through which power is transmitted from said driving-wheel, and being constructed to engage with the teeth on the said ratchet-wheel when they are swung on their pivots away from their axis of revolution, substantially as described.

6. The combination in a clutch, of a driving-wheel having slots in its web eccentric to its axis of revolution, a driven shaft having a carrier mounted upon it independently of the driving-wheel, pawls pivoted to the carrier, an internally-toothed ratchet-wheel in the same plane as the said carrier and studs projecting from the pawls and extending into the slots in the driving-wheel, said pawls being constructed to engage the teeth of the ratchet-wheel when the driving-wheel moves at a higher rate of speed than the said ratchet-wheel, substantially as described.

7. The combination in a clutch, of a driving-wheel having in its web slots eccentric to its axis of revolution, a driven shaft having keyed to it a ratchet-wheel, a carrier on the shaft having arms projecting from it, hooked pawls pivoted to the same, said hooked pawls carrying rollers which enter the slots in the driving-wheel, said pawls being constructed to be thrown into engagement with the teeth of the ratchet-wheel when the driving-wheel is moved at a higher rate of speed than the driven shaft, substantially as described.

8. In an operating mechanism for a lawn-mower, the combination of an internally-toothed traction-wheel, a pinion having eccentric slots in its web within the traction-wheel, a knife-shaft, a ratchet-wheel keyed on the same, a carrier loosely mounted on the shaft carrying pawls constructed to engage the teeth of the ratchet-wheel, studs on the pawls entering the slots in the said pinion, whereby the said pawls are thrown into engagement with the ratchet-wheel when the pinion is revolved at a higher rate of speed than said wheel, substantially as described.

In testimony whereof I have signed my name to this specification in the presence of two subscribing witnesses.

PAUL A. HOUGHTALING.

Witnesses:
WILL. A. BARR,
H. HAYES AIKENS.